United States Patent
Sarh et al.

(10) Patent No.: US 9,610,693 B2
(45) Date of Patent: Apr. 4, 2017

(54) ROBOT FOR CLAMPING ONTO UPRIGHT FRAME MEMBERS

(75) Inventors: Branko Sarh, Huntington Beach, CA (US); Harinder S. Oberoi, Snohomish, WA (US); Rodney S. Wright, Huntington Beach, CA (US); Charles Y. Hu, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 1115 days.

(21) Appl. No.: 13/437,916

(22) Filed: Apr. 2, 2012

(65) Prior Publication Data

US 2013/0185925 A1     Jul. 25, 2013

Related U.S. Application Data

(60) Provisional application No. 61/587,127, filed on Jan. 17, 2012.

(51) Int. Cl.
| | |
|---|---|
| *B21J 15/14* | (2006.01) |
| *B21J 15/30* | (2006.01) |
| *B25J 11/00* | (2006.01) |
| *B64F 5/00* | (2006.01) |
| *B23Q 9/02* | (2006.01) |
| *B25J 15/00* | (2006.01) |
| *B21J 15/10* | (2006.01) |
| *B23Q 9/00* | (2006.01) |

(52) U.S. Cl.
CPC ......... *B25J 15/0052* (2013.01); *B21J 15/105* (2013.01); *B21J 15/142* (2013.01); *B21J 15/30* (2013.01); *B25J 11/007* (2013.01); *B64F 5/0009* (2013.01); *B23P 2700/01* (2013.01); *B23Q 9/0007* (2013.01); *B23Q 9/0035* (2013.01); *B23Q 9/02* (2013.01); *Y10S 901/41* (2013.01); *Y10T 29/49998* (2015.01); *Y10T 29/5118* (2015.01); *Y10T 29/53991* (2015.01)

(58) Field of Classification Search
CPC ........ B21J 15/142; B21J 15/30; B25J 11/007; B23Q 9/02; B23P 19/04; B23P 2700/01; Y10T 29/5118; Y10T 409/30644
USPC ........................................ 29/34 B; 409/179
See application file for complete search history.

(56) References Cited

U.S. PATENT DOCUMENTS

| | | | |
|---|---|---|---|
| 3,059,782 A | * | 10/1962 | Baudhuin ............ B66C 19/005 |
| | | | 180/21 |
| 4,738,583 A | | 4/1988 | Macconochie |
| 5,896,637 A | | 4/1999 | Sarh |

(Continued)

FOREIGN PATENT DOCUMENTS

| | | |
|---|---|---|
| JP | S60255383 A | 12/1985 |
| JP | S6234785 A | 2/1987 |

(Continued)

OTHER PUBLICATIONS

Japanese Office Action Application No. 2013-001464 reported on Nov. 1, 2016.

*Primary Examiner* — Erica E Cadugan
(74) *Attorney, Agent, or Firm* — Miller, Matthias & Hull LLP (57) ABSTRACT

A system includes a frame having spaced apart first and second upright members, and a robot including an end effector and a plurality of arms. The arms extend from the end effector and clamp onto the first and second frame members to position the end effector between the first and second frame members.

19 Claims, 8 Drawing Sheets

(56) References Cited

U.S. PATENT DOCUMENTS

| | | | |
|---|---|---|---|
| 6,098,260 A | 8/2000 | Sarh | |
| 2004/0265081 A1 | 12/2004 | Buttrick | |
| 2006/0218780 A1* | 10/2006 | Lewis | B21J 15/10 29/798 |
| 2010/0217437 A1 | 8/2010 | Sarh et al. | |
| 2011/0010007 A1 | 1/2011 | Sarh et al. | |

FOREIGN PATENT DOCUMENTS

| JP | H03121782 A | 5/1991 |
|---|---|---|
| JP | H0529759 A | 2/1993 |
| JP | 200559161 A | 3/2005 |

* cited by examiner

ROBOT FOR CLAMPING ONTO UPRIGHT FRAME MEMBERS

This application claims the benefit of provisional application U.S. Ser. No. 61/587,127 filed 17 Jan. 2012.

BACKGROUND

During assembly of a panelized aircraft fuselage, skin panels may be spliced together. The splicing may include fastening operations synchronously on opposite sides of the skin panels. For instance, drilling and fastener insertion may be performed outside the fuselage, and fastener termination may be performed inside the fuselage. During the assembly of a panelized fuselage of a large commercial aircraft, several hundred thousand fasteners may be inserted and terminated.

Fastener termination is highly labor intensive. Due to a heavy dependence on manual labor, production rates are subject to constant change. Changes in production rates can lengthen production times.

It would be desirable to create a more stable environment for assembling the fuselages of large commercial aircraft.

SUMMARY

According to an embodiment herein, a system comprises a frame having spaced apart first and second upright members, and a robot including an end effector and a plurality of arms. The arms extend from the end effector and clamp onto the first and second frame members to position the end effector between the first and second frame members.

According to another embodiment herein, a system comprises an aircraft fuselage including skin panels and a plurality of hoop frame members, and a robot including an end effector and a plurality of arms extending from the end effector. The arms terminate in clamps for clamping onto two of the frame members to place the end effector within a bay inside the fuselage. The end effector includes a tool set for performing a splicing operation and means for positioning the tool set within the bay.

According to another embodiment herein, a robot for performing a manufacturing operation between two frame members comprises an end effector, and a plurality of arms terminating in clamps for clamping onto the frame members and positioning the end effector between the frames. The end effector includes a tool positioning device having multiple degrees of freedom for movement between the frames members.

These features and functions may be achieved independently in various embodiments or may be combined in other embodiments. Further details of the embodiments can be seen with reference to the following description and drawings.

DETAILED DESCRIPTION

Figure 1:
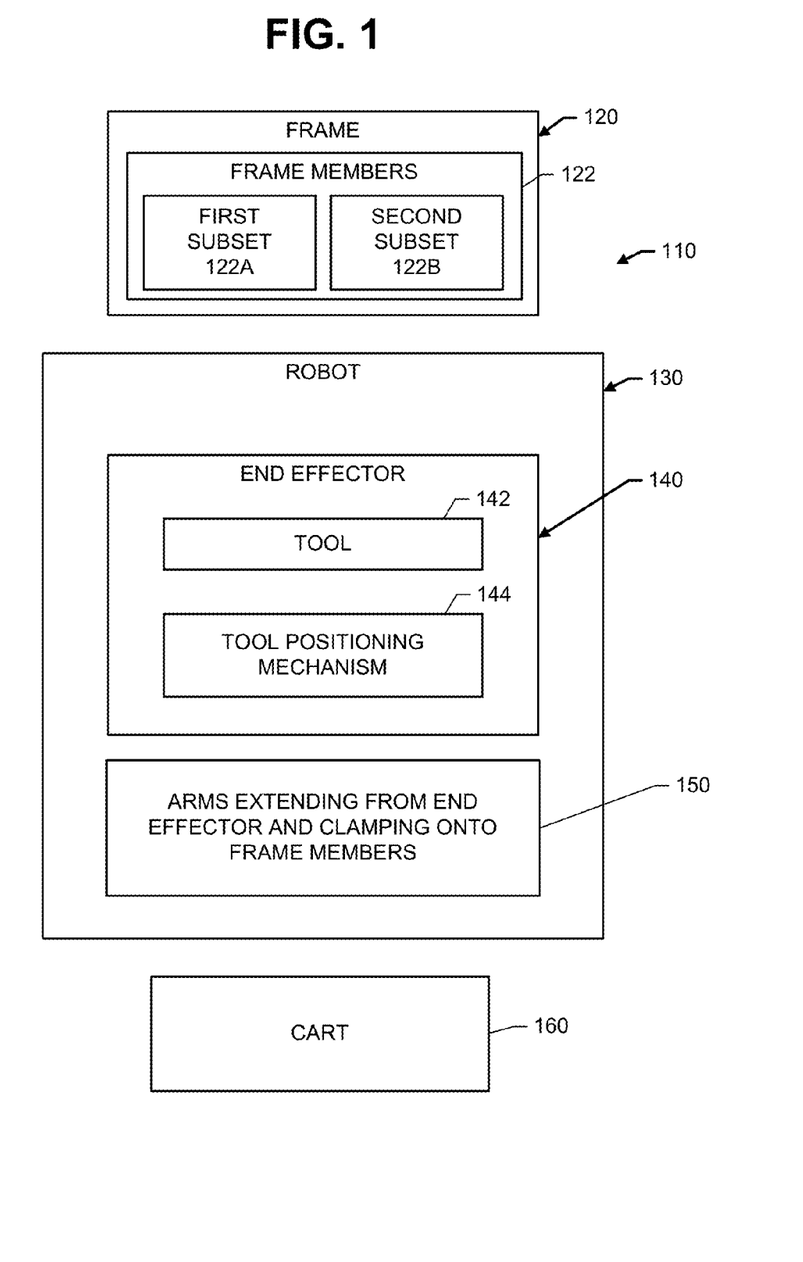
FIG. 1 is an illustration of a system including upright frame members and a robot for clamping onto the frame members.
Figure 2:
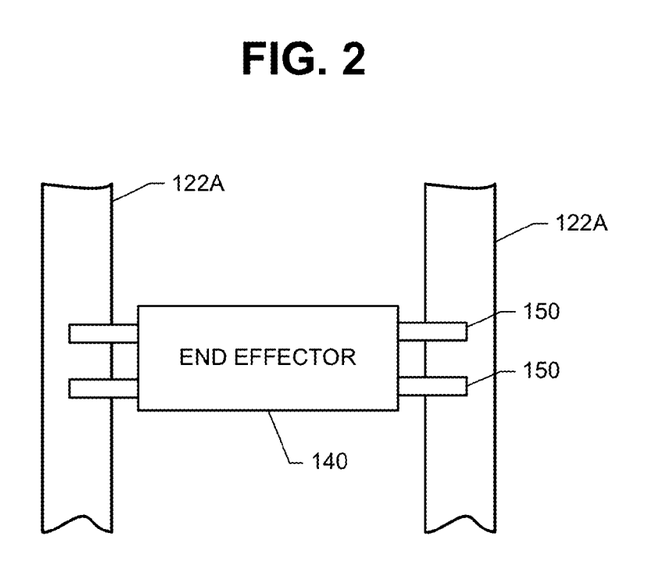
FIG. 2 is an illustration of a robot clamped onto two upright frame members.

Reference is made to FIGS. 1 and 2, which illustrate a system 110 including a frame 120 having spaced apart upright members 122. As used herein, the term "upright member" is not limited to a member that is vertical and straight. For instance, an upright member herein may be vertical and curved. One example of a curved vertical member is an airframe fuselage hoop frame.

The system 110 further includes a robot 130. The robot 130 includes an end effector 140 and a plurality of arms 150. The arms 150 extend from the end effector 140 and are clampable onto at least two frame members 122 to position the end effector 140 between two frame members 122.

Some embodiments of the robot 130 may have four arms 150 for clamping onto two adjacent frame members, with two arms 150 clamping onto each frame member 122 (as shown in FIG. 2). Other embodiments may have two, three, four, six or more arms 150. In different embodiments, the arms 150 may clamp onto more than two frame members 122, they may clamp onto two frame members 122 that are not adjacent, etc.

In the paragraphs that follow, reference will be made to first and second subsets 122a and 122b of the frame members 122. The first subset 122a refers to those frame members 122 to which the arms 150 are clamped. The second subset 122b refers to those frame members 122 between which the end effector 140 is positioned. Typically, the first and second subsets 122a and 122b will contain the same frame members 122. For example, the end effector 140 may be clamped to and positioned between two adjacent frame members 122 (as illustrated in FIG. 2). In some embodiments, however, this will not be the case.

Prior to clamping, the arms 150 may be adjusted in length and orientation to enable clamping onto the frame members 122. After clamping, however, the length and orientation of the arms 150 are locked.

The end effector 140 may include a tool set 142 of one or more tools for performing one or more manufacturing operations. Examples of manufacturing operations include, but are not limited to, machining, fastener termination, rivet insertion, sealant application, inspection, and part location.

The end effector 140 further includes a mechanism 144 for adjusting the position of the tool set 142 between the second subset 122b of frame members 122. In some embodiments, the mechanism 144 may have multiple (e.g., six) degrees of freedom for positioning the tool set 142.

The system 110 further includes a mobile cart 160 for supporting, lifting and otherwise initially positioning the robot 130 with respect to the frame members 122. The cart 160 may be moved manually or it may be motor-driven. The cart 160 may have self-contained power (e.g., batteries) or cables for supplying power to it. The cart 160 may further include a processor-based controller programmed with artificial intelligence for autonomous operation.

Figure 3:
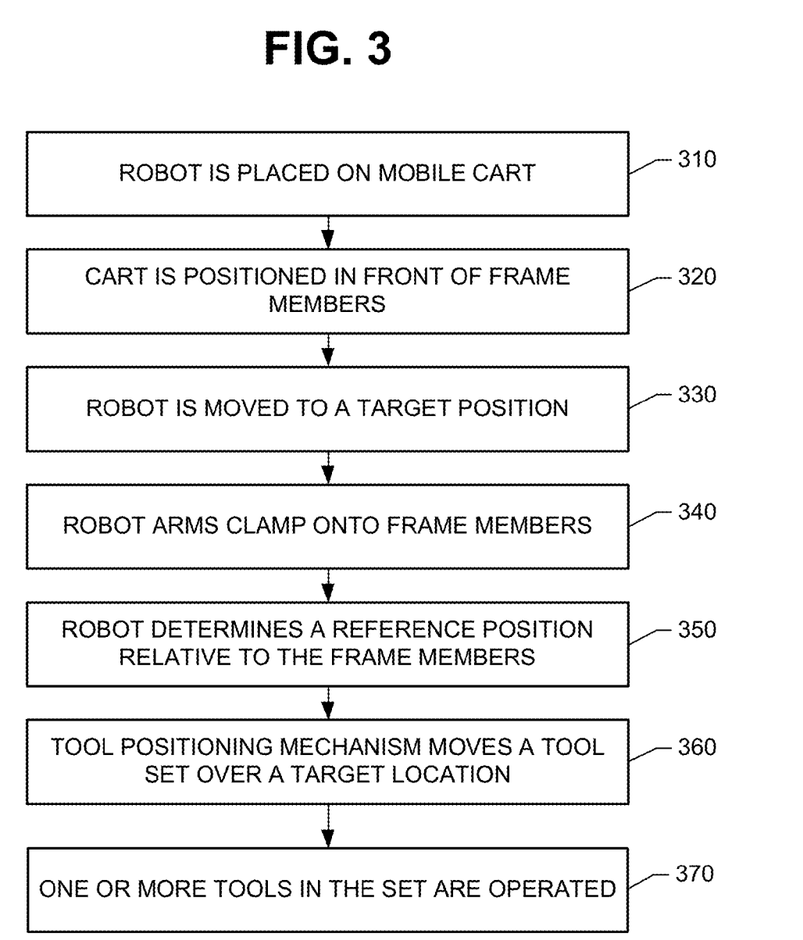
FIG. 3 is an illustration of a method of using a robot to perform manufacturing operations between two upright frame members.

Additional reference is now made to FIG. 3, which illustrates a method of using the robot 130 to perform a manufacturing operation between upright frame members 122. The robot 130 is placed on the mobile cart 160 (block 310), the cart 160 is positioned in front of the first subset 122a of the frame members 122 (block 320), and the cart 160 moves the robot 130 to a target position with respect to the frame members (block 330).

Once at the target position, the arms 150 of the robot 130 are clamped onto the first subset 122a of frame members 122 (block 340). The end effector 140 is now rigidly attached to those frame members 122. The first subset 122a of frame members 122 provides stiffness and stability for the end effector 140.

After the robot 130 has been clamped to the frame members 122, the robot 130 determines a reference position (block 350). For instance, the tool set 142 may include a vision system for identifying a key feature of a frame member 122 or other structure supported by the frame members 122.

Using this reference position, the tool positioning mechanism 144 moves the tool set 142 over a target location (block 360). One or more tools in the set 142 are operated at the target location (block 370).

The robot 130 is especially beneficial for performing manufacturing operations at substantial heights. The end effector 140 is rigidly clamped to the frame members 122, which provide stiffness and stability for precisely positioning the tool set 142. In contrast, a long robot arm for raising, positioning and holding a robot at a substantial height would lack the stiffness and stability for precise positioning of the end effector.

Moreover, the robot 130 herein doesn't require a powerful machine to raise it to the target position. Consequently, a relatively small cart 160 having a lift platform may be used to lift the robot 130 to the target position.

One particular area of interest for a robot 130 herein is the manufacture of panelized fuselages of large commercial aircraft. Certain commercial aircraft fuselages include hoop-shaped frame members and skin panels that are spliced together.

Figure 4:
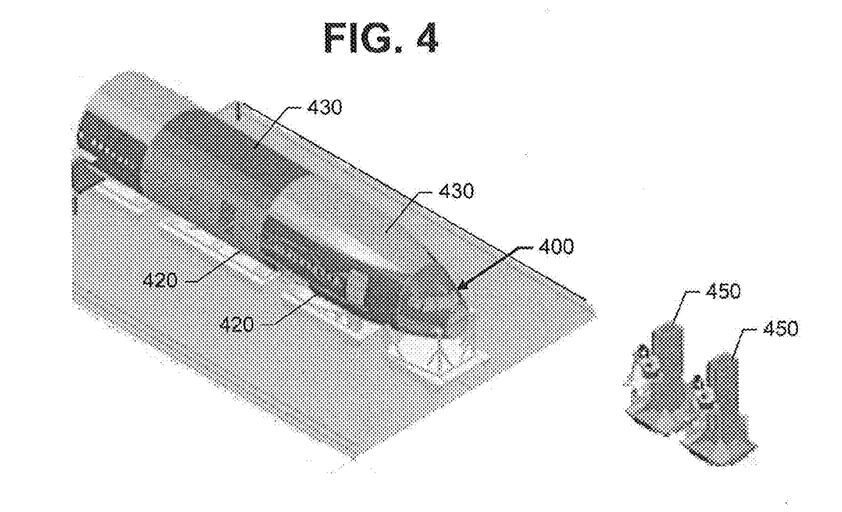
FIGS. 4 and 5 are illustrations of a panelized aircraft fuselage.
Figure 5:
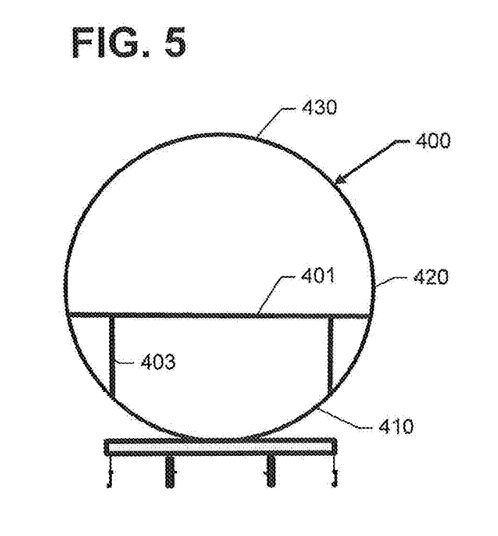

FIGS. 4 and 5 illustrate a panelized aircraft fuselage 400 having a large diameter (e.g., approaching 20 feet). The fuselage 400 includes a floor 401 that is supported by stanchions 403. The fuselage 400 further includes keel panels 410 (not shown in FIG. 4), lower panels 420, and crown panels 430 that are spliced together (in FIG. 4, the lower and crown panels 420 and 430 are shaded for clarity).

The panels 410, 420 and 430 may be spliced longitudinally (that is, along the length of the fuselage 400) and circumferentially. The splicing may include complementary operations inside and outside the fuselage 400. The exterior operations may include fastener insertion. For instance, holes may be drilled into the panels and fasteners may be inserted through the holes.

The interior operations may include fastener termination. For instance, the fastener termination may include upsetting the ends of rivets.

The exterior operations may be performed by exterior robots such as the exterior robots 450 illustrated in FIG. 4. Each exterior robot 450 may include an end effector that is configured to insert fasteners, and a positioning system for translating and orienting the end effector. For example, the combination of an x-y-z mover and a spherical wrist provides six degrees of freedom for positioning the end effector with respect to an outer surface of a fuselage 400. A robot arm may enable the end effector to reach the belly and crown of the fuselage 400. An automated system for assembling the panels 410, 420 and 430 and performing the exterior operations is described in assignee's U.S. Ser. No. 13/327,669 filed 15 Dec. 2011, which is incorporated herein by reference.

Figure 6A:
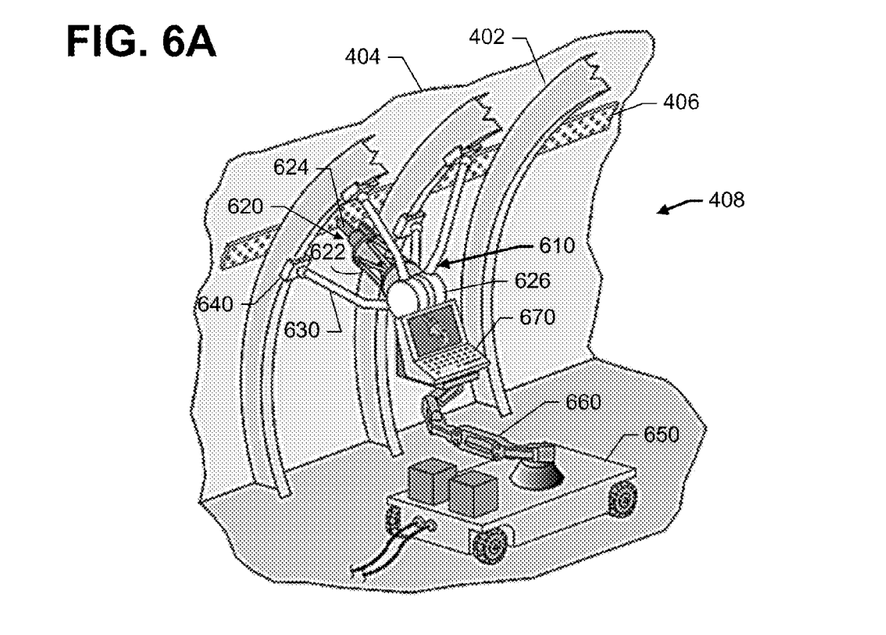
FIGS. 6A and 6B are illustrations of a robot configured to perform fastener termination inside an aircraft fuselage.
Figure 6B:
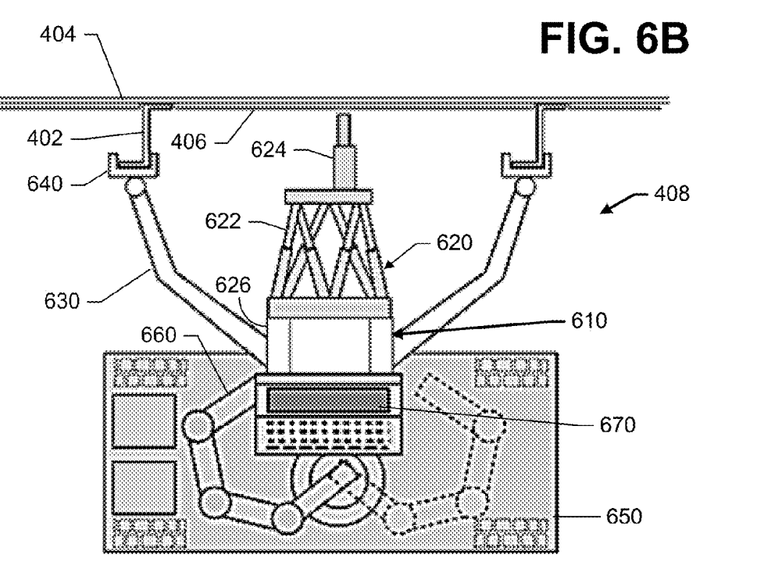

Reference is now made to FIGS. 6A and 6B, which illustrates an interior 408 of the panelized aircraft fuselage 400 during the interior splicing operations. The aircraft fuselage 400 includes hoop frame members 402 and skin panels 404. The skin panels 404 are held to the frame members 402 via tack fasteners prior to splicing. The skin panels 404 will be spliced longitudinally (for instance, at a longitudinally-extending joint 406). The skin panels 404 will be spliced circumferentially.

FIGS. 6A and 6B also illustrate an example of a robot 610 that is configured to perform fastener termination within the fuselage interior 408. The robot 610 includes arms 630 that terminate in clamps 640, which grip and lock onto the frame members 402. In the embodiment shown in FIGS. 6A and 6B, the robot 610 includes four arms 630 for clamping onto two adjacent frame members 402. Two arms 630 clamp onto each frame member 402. Each clamp 640 may be mechanically jointed to the end of its corresponding arm 630.

An end effector 620 of the robot 610 includes a kinematic linkage 622 for moving a fastener termination tool set 624 between the adjacent frame members 402, and a wrist 626 for rotating the linkage 622. In some embodiments, the linkage 622 and the wrist 626 may provide six degrees of freedom for orienting the tool set 624. In some embodiments, the tool set 624 may include a rivet bucking bar, air cylinder, and a vision system.

FIGS. 6A and 6B also illustrate a mobile cart 650, which carries an equipoise arm 660 for lifting the robot 610 to its target position so the clamps 640 can grab onto the frame members 402. The equipoise arm 660 extends from the mobile cart 650 and is coupled to the robotic wrist 626. The equipoise arm 660 is dynamically balanced for movement.

Some embodiments of the mobile cart 650 may carry a computer 670. The computer 670 may control the operation of the robot 610 and the mobile cart 650. In other embodiments, the robot 610 and the mobile cart 650 may be controlled from a remote control station.

Figure 7:
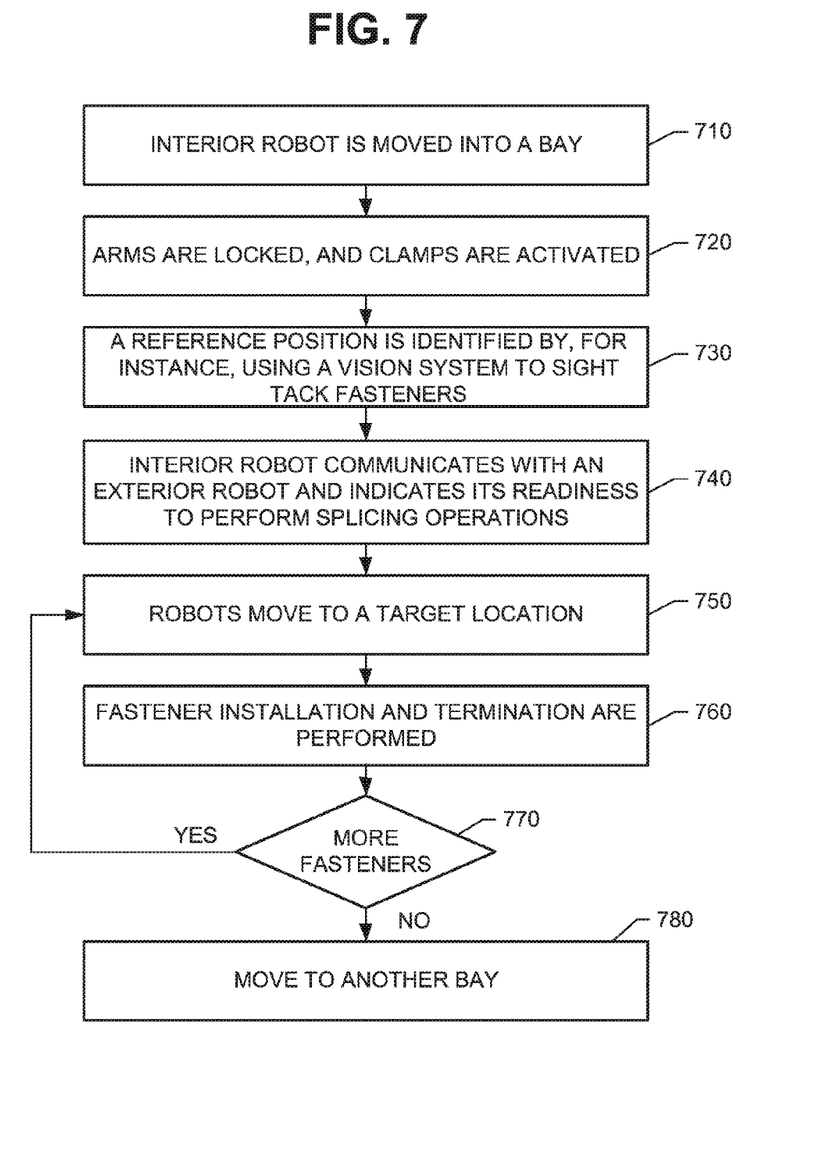
FIG. 7 is an illustration of a method of performing a splicing operation on a panelized aircraft fuselage.

Reference is made to FIG. 7, which illustrates a method of performing a splicing operation on the panelized aircraft fuselage 400. The splicing operation may be used to make a splice along the longitudinally-extending joint 406, or it may be used to make a splice along a circumferentially-extending joint (such as the joint 407 illustrated in FIG. 8B).

At block 710, the cart 650 moves the robot 610 into a bay. For instance, the cart 650 moves the robot 610 in front of two adjacent frame members 402, and the equipoise arm 660 deploys the robot 610 in two directions to the joint. For a longitudinal splice, the arm 660 moves the end effector 620 in a Y-direction and the wrist 626 rotates about an A-axis until the clamps 640 are touching the frame members 402. For a circumferential splice, the arm 660 moves the end effector 620 in Z and Y directions. At this point, the robot 610 is aligned with the frame members 402.

At block 720, the arms 630 are locked, and the clamps 640 are activated. The robot 610 is now attached to the frame members 402.

At block 730, a reference position is identified. For instance, the robot 610 uses a vision system to move the tool set 624 to a first tack fastener, and records the position of the first tack fastener. The robot 610 then moves the tool set 624 to a second tack fastener and records the position of the second tack fastener. The splicing operations will be performed with reference to these two tack fastener positions.

At block 740, the robot 610 communicates with an exterior robot 450 and indicates its readiness to perform the splicing operations with respect to the two tack fasteners. At block 750, the exterior robot 450 moves a fastener insertion tool set to a first target location with respect to the two tack fasteners, and commands the robot 610 to move the tool set 624 to the first target location.

At block 760, fastener installation and termination are performed at that first target location. For instance, the external robot 450 activates an electromagnet in its end effector, which magnetically attracts a metal plate in the end effector 620 of the robot 610. As a result, the joint 406 is clamped between the end effectors of the two robots 610 and 450. The exterior robot 450 then drills a hole at the first target location, forms a countersink, positions a rivet at the drilled hole, and activates a rivet hammer. The robot 610 opposes the rivet hammering action, thereby upsetting an end of the rivet. At this point, a rivet has been inserted and terminated at the first target location.

Additional rivets are inserted and terminated in a similar manner (block 770). After the longitudinal joint 406 has been spliced, and any other longitudinal joints at that bay have been spliced, the cart 650 may then move the robot 610 to another bay, or the robot 610 may be commanded to perform circumferential splicing at that bay (block 780).

Figures 8A, 8B:
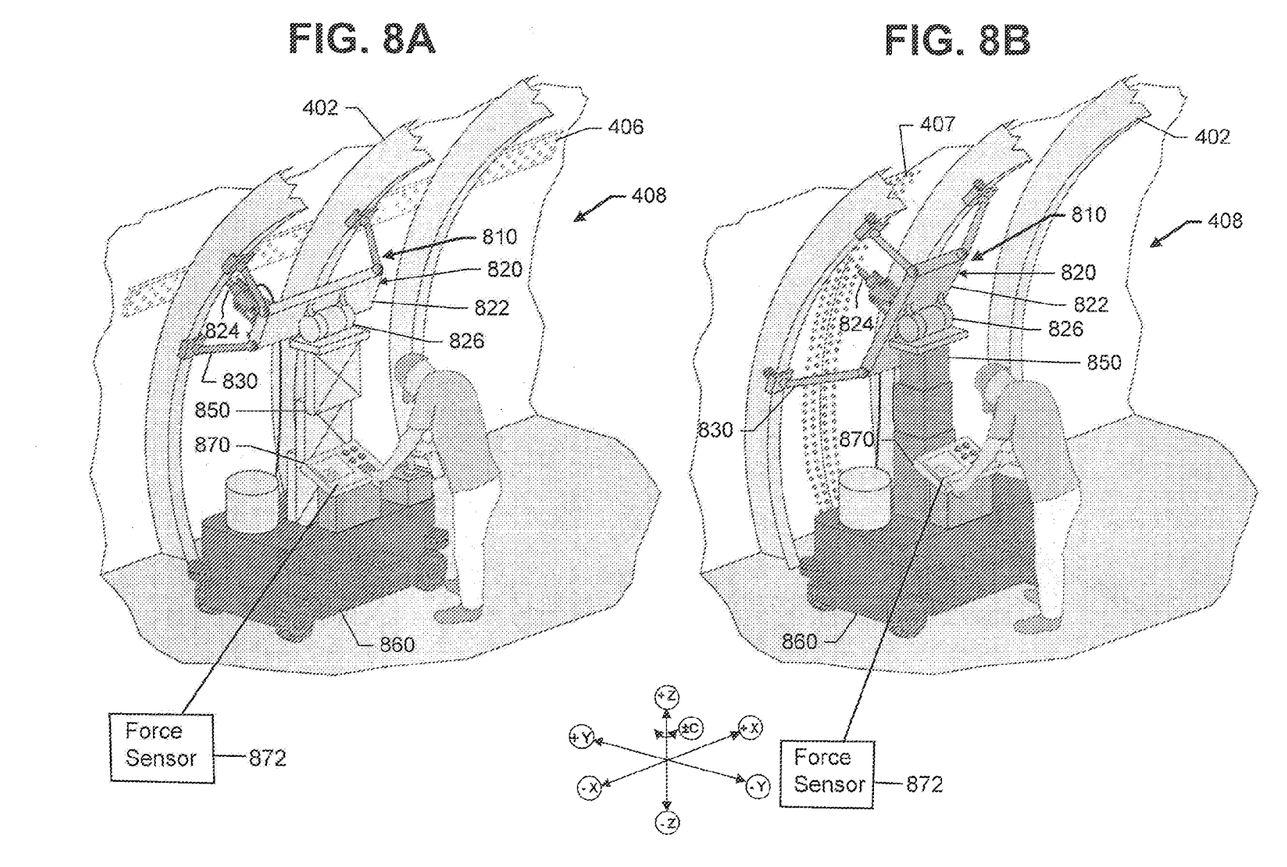
FIGS. 8A and 8B are illustrations of a robot configured to perform fastener termination inside an aircraft fuselage.

Reference is now made to FIGS. 8A and 8B, which illustrate another example of a robot 810 configured to perform fastener termination within the fuselage interior 408. The robot's end effector 820 includes an elongated plate 822 that spans at least two frame members 402, and a mechanism (not shown) for moving a fastener termination tool set 824 along the plate 822. The plate 822 is coupled to a telescopic tower 850 via a robotic wrist 826.

In some embodiments, the plate 822 has a length that spans an intermediate frame member. In those embodiments, the arms 830 space the plate 822 apart from the frame members 402 so the tool set 824 can be moved to a stowed position and moved past the intermediate frame member.

The telescopic tower 850 and a controller 870 are carried by an autonomous mobile cart 860. The controller 870 commands the tower 850 to move the robot 810 in a Z-direction, the mobile cart 860 to move along the X and Y-axes, and the wrist 826 to rotate about a C-axis.

FIG. 8A shows the plate 822 oriented for making a longitudinally-extending splice along a longitudinally-extending joint 406. The cart 860 may be stationary as the tool set 824 is moved in the longitudinal direction along the joint 406.

FIG. 8B shows the end effector 820 rotated for making a circumferentially-extending splice along the joint 407. To move the end effector 820 in a circumferential direction, the telescopic tower 850 moves the end effector 820 in a Z-direction, the cart 860 moves the end effector 820 in a Y-direction, and the wrist 826 rotates the plate 522 to rotate. Force sensor 872 feedback may be used to automatically control the movement of the mobile cart 860, the telescopic tower 850, and the wrist 826.

Figure 9:
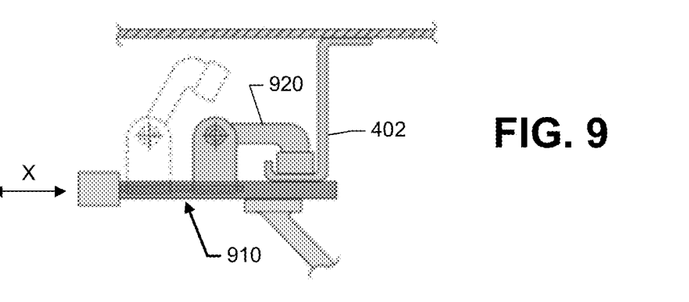
FIGS. 9, 10 and 11 are illustrations of different robot clamps for clamping onto frame members.
Figure 10:
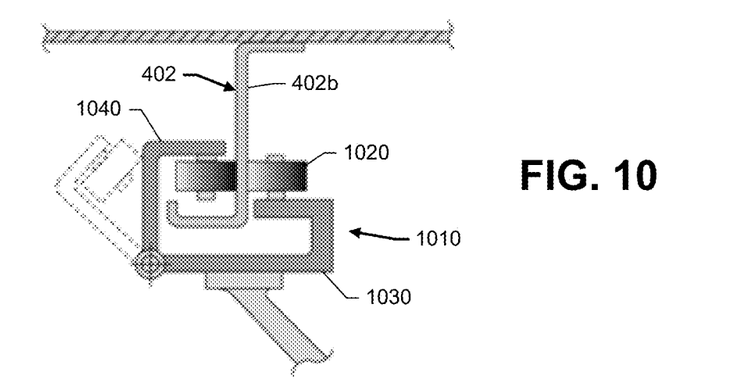
Figure 11:
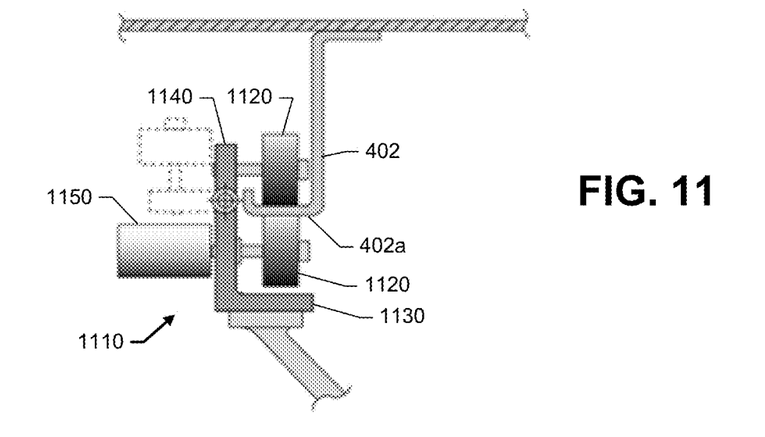

Reference is now made to FIGS. 9-11, which illustrate embodiments of different clamps 910, 1010 and 1110 for a robot herein. In all three embodiments, the clamps 910, 1010 and 1110 remain engaged with the frame member 402 as the robot is being moved in a circumferential direction.

The clamp 910 of FIG. 9, includes a retractable arm 920 that is moved to a first position (shown in solid) to engage an outer flange 402a of the frame member 402 and that is moved to a second position (shown in phantom) to disengage the outer flange 402a. Clamp motion in the X-direction compensates for distance variations between frame members 402.

The clamp 1010 of FIG. 10 includes rollers 1020 on opposite sides of the web 402b of the frame member 402. One of the rollers 1020 is carried by a fixed arm 1030, and the other roller is carried by a retractable arm 1040. When the retractable arm 1040 is moved to a first position (shown in solid), both rollers 1020 engage the frame member 402 and can roll along the frame member as the robot is being moved in a circumferential direction. When the retractable arm 1040 is moved to the retracted position (shown in phantom), the clamp 1010 can disengage the frame member 402.

The clamp 1110 of FIG. 11 includes rollers 1120 on opposite sides of the outer flange 402a of the frame member 402. One of the rollers 1020 is carried by a fixed arm 1130, and the other roller is carried by a retractable arm 1140. When the retractable arm 1140 is moved to the position shown in phantom, the clamp 1110 can disengage the frame member 402. When the retractable arm 1140 is moved to the position shown in solid, both rollers 1020 engage the frame outer flange 402a. A motor 1150 drives the one roller 1120, whereby the clamp 1110 is propelled in a circumferential direction. A plurality of these clamps 1110, operating cooperatively, can move a robot herein in a circumferential direction with or without the assistance of a telescoping tower and mobile cart.

A system herein is not limited to an aircraft fuselage frame. A system herein may include a frame such as, without limitation, a house, railroad car, or ship.

The invention claimed is:

1. A system comprising:
   a frame having spaced apart first and second frame members; and
   a robot including an end effector and a plurality of arms extending from the end effector, the plurality of arms configured to clamp onto, and propel on, the first and second frame members to position the end effector between the first and second frame members, wherein the end effector is rotatable between a first orientation and a second orientation, wherein, in the first orientation, the plurality of arms are clamped onto, and configured to propel on, the first and the second frame members such that the end effector is in position between the first and the second frame members for longitudinal splicing, and wherein, in the second orientation, the plurality of arms are clamped onto, and configured to propel on, the first and the second frame members such that, during circumferential splicing, the end effector is capable of being propelled circumferentially via the plurality of arms propelling circumferentially on the first and the second frame members.

2. The system of claim 1, further comprising a cart for positioning the robot so the arms can clamp onto the frame members.

3. The system of claim 2, wherein the cart includes a lift for the robot.

4. The system of claim 1, wherein the frame members are aircraft fuselage frame members.

5. The system of claim 4, wherein the end effector includes a tool configured to perform fastener termination.

6. The system of claim 1, wherein the end effector includes a tool and a mechanism for positioning the tool at target locations between the frame members.

7. The system of claim 6, wherein the mechanism includes a robotic wrist for positioning the tool.

8. The system of claim 6, wherein the mechanism is configured for moving the tool relative to the frame.

9. The system of claim 8, wherein the robot is coupled to a telescopic tower via a robotic wrist.

10. The system of claim 6, wherein the end effector includes an elongated plate that spans at least two frame members, and wherein the tool is movable along the plate.

11. The system of claim 10, wherein the plate is clamped to first and second frame members and spans an intermediate frame member; and wherein the arms space the plate apart from the frame members so the tool can be moved past the intermediate frame member to a stowed position.

12. The system of claim 10, wherein the plate is coupled to a lift platform via a robotic wrist.

13. The system of claim 10, wherein the robot includes force sensors for sensing movement along the frame members; and wherein a cart includes a controller, responsive to the sensors, for causing the cart to follow the robot.

14. The system of claim 1, wherein the frame members include flanges and webs; and wherein free ends of the arms include clamps for engaging the flanges.

15. The system of claim 14, wherein the clamps include driven wheels that are movable to a drive position for rolling along flanges of the frame members.

16. A method of using the system of claim 1 to perform longitudinal and circumferential splicing operations on an aircraft fuselage, wherein the first and second frame members are fuselage frame members and wherein the arms are clamped to the fuselage frame members during the splicing operations.

17. The method of claim 16, wherein tack fasteners are sighted and used as a reference location for tool movement during the splicing operations.

18. A system comprising:
an aircraft fuselage including skin panels and a plurality of hoop frame members; and
a robot including an end effector and a plurality of arms extending from the end effector, the arms terminating in clamps for clamping onto, and for propelling on, two of the frame members; the end effector including a tool set for performing a splicing operation and means for positioning the tool set, wherein the splicing operation is one of longitudinal splicing along the aircraft fuselage and circumferential splicing wherein the end effector is circumferentially drivable via circumferential propelling of the clamps on the hoop frame members.

19. A system comprising:
a frame having spaced apart first and second frame members;
a robot including an end effector and a plurality of arms extending from the end effector, the end effector including a tool and a mechanism for positioning the tool at target locations between the frame members, the end effector including an elongated plate that spans at least two frame members, the tool movable along the plate, the plurality of arms configured to clamp onto the first and second frame members to position the end effector between the first and second frame members, wherein the end effector is rotatable between a first orientation between the first frame member and the second frame member for longitudinal splicing and a second orientation for circumferential splicing, wherein, in the second orientation, the end effector is circumferentially drivable along the frame members, and wherein the robot includes force sensors for sensing movement along the frame members; and
a cart including a controller, responsive to the force sensors, for causing the cart to follow the robot.

* * * * *